INVENTOR.
JIRI HRDINA

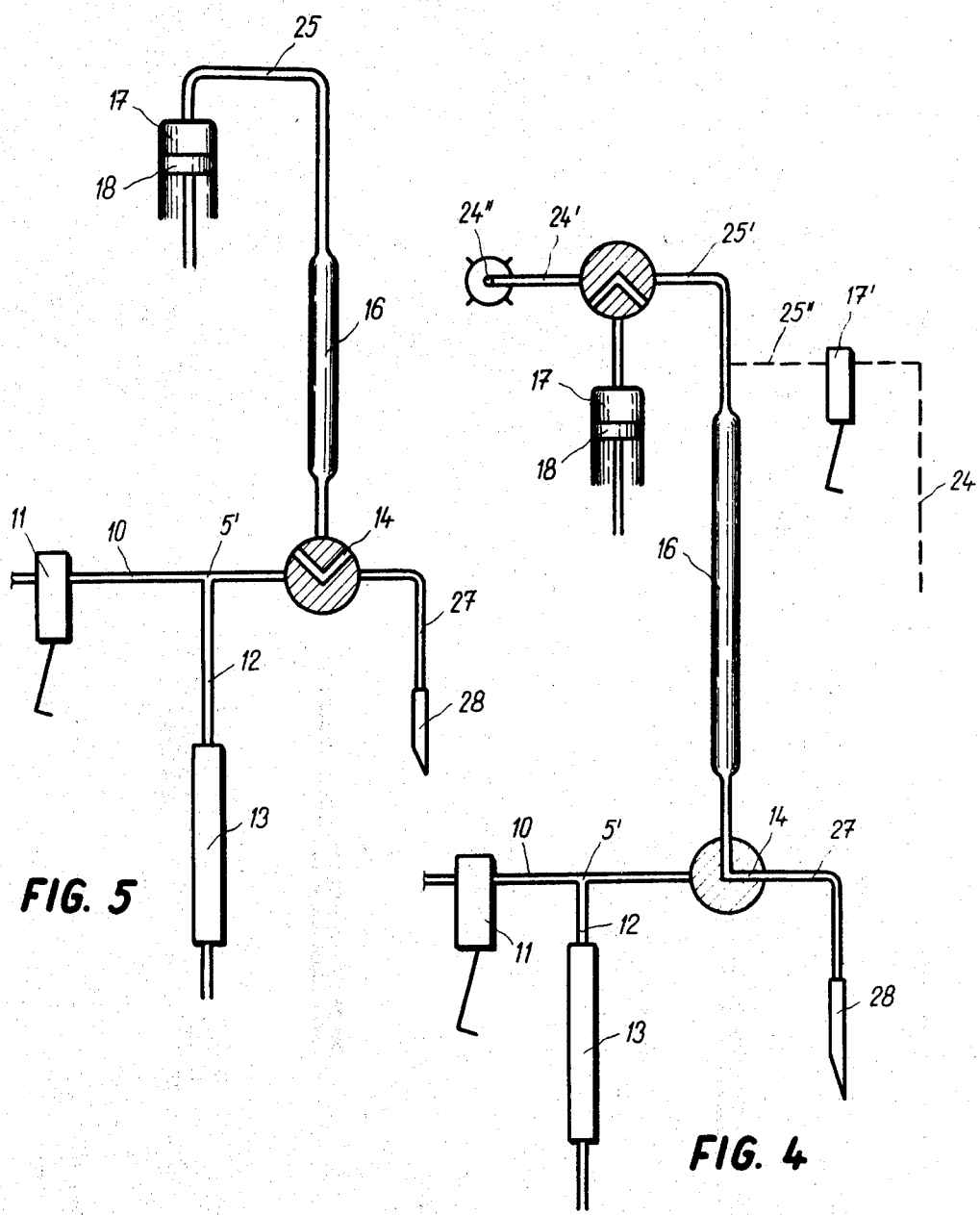

United States Patent Office 3,530,721
Patented Sept. 29, 1970

3,530,721
APPARATUS FOR AUTOMATIC SAMPLE LIQUID LOADING FOR CHROMATOGRAPHY COLUMNS
Jiří Hrdina, Prague, Czechoslovakia, assignor to Ceskoslovenska akademie ved, Prague, Czechoslovakia, a corporation of Czechoslovakia
Continuation of application Ser. No. 749,252, July 22, 1968, which is a continuation of application Ser. No. 457,997, May 24, 1965. This application July 2, 1969, Ser. No. 845,609
Claims priority, application Czechoslovakia, June 1, 1964, 3,160/64
Int. Cl. G01n 1/14
U.S. Cl. 73—423          15 Claims

ABSTRACT OF THE DISCLOSURE

An apparatus for supplying liquid samples to a chromatographic column. The samples initially within reservoirs disposed on a turntable. A take-off needle sequentially removes the samples as the turntable positions the reservoirs, the sample reservoirs adjacent the take-off needle in a manner known in the art. According to this invention the samples are first pumped to an intermediate receptacle prior to being switched to the elutant stream and the chromatography column.

This application is a continuation of my application Ser. No. 749,252 filed July 22, 1969, now abandoned which was in turn a continuation of my application Ser. No. 457,997 filed May 24, 1965, now abandoned.

In fully automatic analytic, e.g. chromatographic processes, where a high degree of precision is required, the substances to be analyzed are absorbed on the surface of the sample receptacles or enter by diffusion into the walls of these receptacles and the tubings conducting the samples into the column. These retained amounts of the substances affect the accuracy of the analytic process in two ways: on the one hand they represent a loss in the quantity of the sample to be analyzed and on the other hand they bring also the risk that the retained substance is freed progressively or sometimes even suddenly, e.g. when the conditions of elution are suddenly altered and the substance thus freed appears at the end as analysis of the retained amounts distorting the result of the analysis required.

These disturbing phenomena may be partly suppressed by creating conditions avoiding the adherence of the substance on the walls or respectively their diffusion into the walls. This may be done by hydrofobizing the inner surfaces of the sample receptacles and of the tubings conducting the samples. It is, however, difficult to achieve a perfect hydrophobization and impossible to maintain this hydrophobization in the long run.

The quantity of the retained substances increases with the time during which the substances are in contact with the walls and this even in the case when the wall has been previously exposed to the action of solutions decreasing the adherence of the substance to the wall or its diffusion into the wall.

For the reasons explained it is advantageous to introduce the samples into the sample receptacles before (preferably shortly before) they are transferred into the column. It is an object of this invention to provide a process and an apparatus which enables the transfer of the samples into the column with the minimum of the mentioned disadvantages, avoiding the adherence of portions of the sample on the walls or an adsorption of the samples in the walls of the sample receptacle. By appropriately choosing the quantity of the solutions which remain over a long time between the sample transfer periods in the sample receptacle or respectively in the adjoining tubing, it is possible to assure condition for washing out the residue which may still have been retained on or respectively in the walls. Shortly before the samples are sucked from the sample reservoirs into the sample receptacles optimum conditions may be provided for minimizing the retainance of the samples on the walls and assure optimum conditions for the stability of a potential hydrophobization.

The process and apparatus according to the present invention as described hereafter may be used, however, also in all instance where the above mentioned undesired phenomena do not appear or respectively where the degree of the influence on the result is negligible.

The substance of the invention resides therein that the samples are sucked from sample reservoirs into the sample receptacles before (preferably shortly before) they are carried away into the column by the current of the eluent, the eluent receptacles being alternately connected to the hydraulic transfer of the column and to the branch sucking the sample from the sample reservoirs. The samples may be in the tubing or in the sample receptacles respectively preceded and followed by an eluent section separated from the sample itself by a gas bubble. After the samples and the protective buffers have been sucked into the sample receptacle the eluent is admitted into the apparatus for washing out the system. The process is advantageously carried out by filling the sample receptacles by submerging their opening or respectively the capillary tubing connected to this opening under the surface of the samples and protective buffers.

The apparatus for carrying out the process according to the invention may consist of a programmed metering device which can be connected with the sample receptacle over a hydraulic distributor and of a programmed pump conveying the eluent and/or the samples over the said hydraulic distributor into the column. The sample reservoirs and the eluent reservoirs are preferably placed on a table relatively displaceable towards the ends of a tubing connected to the sample receptacle the said end of the tubing being adapted to be submerged into the liquid contained in the sample reservoirs and eluent reservoirs. A hollow needle may be connected to the said end of the tubing, this needle being capable of piercing a membrane sealing the opening of the said sample reservoirs.

FIGS. 2 to 5 are each diagrammatic views of other embodiments of the invention.

Figure 1:
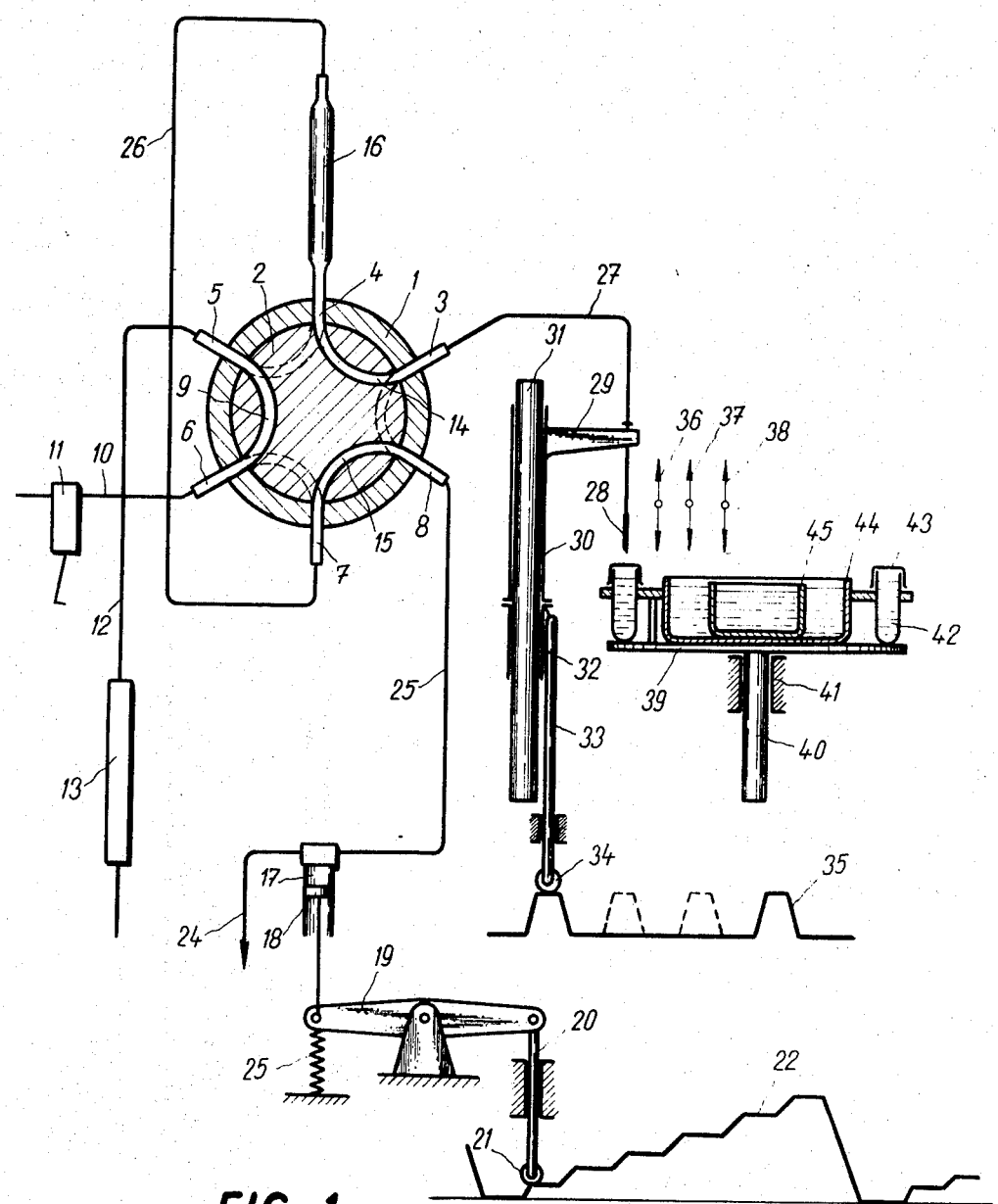
FIG. 1 is a diagrammatic view of one embodiment of the invention.

A hydraulic change-over switch consists of a stationary casing 1 to which a rotatable core 2 is tightly fitted. The casing 1 has six peripheral necks 3, 4, 5, 6, 7, 8; two adjacent necks are spaced by an angular pitch inferior to 60 degrees, the remaining pitch between the necks 8 and 3 being thus greater than 60 degrees. The core 2 has three interconnecting ports which can interconnect a pair of adjacent peripheral necks at a time. In the position indicated in FIG. 1 by full lines, the connecting port 9 interconnects, for example, the delivery branch 10 of the pump 11 directly with the supply tubing 12 leading straight to the column 13. Another port 14 of the core 2 interconnects the necks 3 and 4, while the port 15 interconnects the necks 7 and 8. This is the case in the functional position, when the pump 11 presses the respective buffer straight into the column 13.

The second hydraulic circuit including a capillary receptable 16, is either out of action or may be in the aforesaid position filled or rinsed. The filling and rinsing is effected by the action of another special pump, represented diagrammatically by a cylinder 17 and a piston 18, actuated through a double-reversing lever by a tie rod 20 fitted with a roller 21, that engages a cam 22, the profile of the latter being schematically shown in developed form. The cam 22 is against a spring 23. The pump draws the respective liquids or air bubbles to a drain 24 by means of the suction piping 25, which, by way of the necks 8 and 7, interconnected by the port 15, is connected to another tubing 26 connected to the top end of the capillary recepacle 16. The bottom end of this receptacle is connected to the neck 4 which in its turn is connected by a port 14 to a neck 8 and from there by a very thin and elastic capillary tube to an injection needle 28 which is attached to an arm 29. The arm 29 moves, together with a tubular guide system 30 on a column 31 and is raised by a sleeve 32 which is displaceable on the column 31 being actuated by an articulated tie rod joined to it or by a strut 33, the bottom end of which carries a roller 34 which engages a further cam 35, shown in a developed form. Through the action of this cam 35, the injection needle 28 moves up and down. The double arrows 36, 37 and 38 show the relative positions and movements of the needle 28 respective towards the reservoirs, situated, for instance, on a miniature table 39, rotary round a pin 40 mounted in a bearing 41. With this arrangement, either by turning the arm 29, round the column 31, or by a transverse displacement of the bearing 41, and thereby, of the entire table 39, the whole system of reservoirs can move in such a way, that they adopt a relative position toward the injection needle 28 as shown by the said double arrows 36, 37 and 38. Meanwhile, the individual samples are sucked into the receptacle 16 together with the required amounts of covering buffers, if desired with bubbles separating the respective sections from each other. From the receptacle 16 they are then transported to the column 13 by turning the core 2 of the hydraulic change-over switch by one pitch to the left in such a way that the ports 9, 14 and 15 adopt the positions marked by dashed lines. After such a switching-over, the pump 11 forces the buffer by its branch 10 through the neck 6 into the neck 7 and from there, by way of the receptacle 16, into the neck 4 and further on through a port of the core 2 into the neck 5, from which then the buffer which carries away the sample from the receptacle 16, flows through a capillary conduit 12 into the column 13.

All tubings and connecting ports, through which the sample flows, have to be capillary, while the rest of the tubings need not be capillary.

The individual samples to be analyzed are first placed in miniature reservoirs 42, covered, if necessary, to avoid evaporation, by a thin membrane 43. Any desired number of reservoirs 42 may be arranged on the periphery of the table 39 and by turning the shaft 40, and the table 39, by one pitch, the individual reservoirs 42 are successively brought under the injection needle 28. The latter pierces, during its downward move the membrane 43 and penetrates down to the bottom of the reservoirs 42. By the action of the piston 18 in the cylinder 17 the sample is sucked in by the injection needle 28 over the capillary tube 27 and the necks 3 and 4 into the receptacle 16. By a suitable mutual orientation of the shapes and positions of the cams 35 and 22 it can be achieved that, for instance, in the position indicated in FIG. 1, the piston 18 is displaced by the action of the first stepped elevation of the cam 22, the injection needle 28 being raised above the sample surface by the action of the cam 35. In the following stage the needle 28 penetrates under the sample surface and remains there as long as the cam 35 has the shape indicated by a full line in the drawing, that is, even during the intervals when the next stepped-up elevations of the cam 22 produce a further sucking action of the piston 18 and, consequently a resuction of the sample from the reservoir 42 into the receptacle 16. If, however, the cam 35 presents a profile with further humps indicated by dashed lines, an alternate sucking-in of the sample and air would take place, so that the sample would enter the receptable 16 being interrupted by bubble piston. This is not desirable for the sample itself, but is desirable for the protecting buffers on both ends of the sample, these buffers being also separted from the samples by bubble pistons. Though this measure is not indispensable, it offers considerable advantages particularly in the instance wherefor any reason the complete transport of the sample from the receptacle 16 to the column should not be carried out by a larger amount of buffer.

The rinsing of the injection needle 28 and the capillary tube 27, as well as of the port 14 and the necks 3 and 4, or possibly also of a part of the receptacle 16, is carried out by the protecting buffer in a way identical to the above described sucking-in of the samples, advantageously between the bubbles, the only difference consisting therein that the needle 28 does not draw the respective buffers from the reservoirs 42, but from one of a plurality of, for instance, centrically disposed, common reservoirs 44, 45 containing the respective solutions. The required relative displacement of the needle 28 towards the table 39 is carried out by an additional cam mechanism which is not shown in FIG. 1. The rinsing of the entire system of tubes and of the receptacle 16 can be performed by an arbitrary number of repeated strokes, either in continuous sequence or spaced in arbitrary time intervals. Thus is is possible, for instance, to convey into the tubing solutions which will suppress the diffusion or any other type of bond, such as adsorption, of traces of substances in the walls of the receptacle 16 and the tubings.

The relative displacement of the needle 28 and the table 39 may also be achieved by the cams 34 and 35 imparting a movement to the whole table 39 instead of displacing only the needle 28. This enables a connection of the needle 28 to the neck 3 by a very short and this capillary tube.

Figures 2, 3:
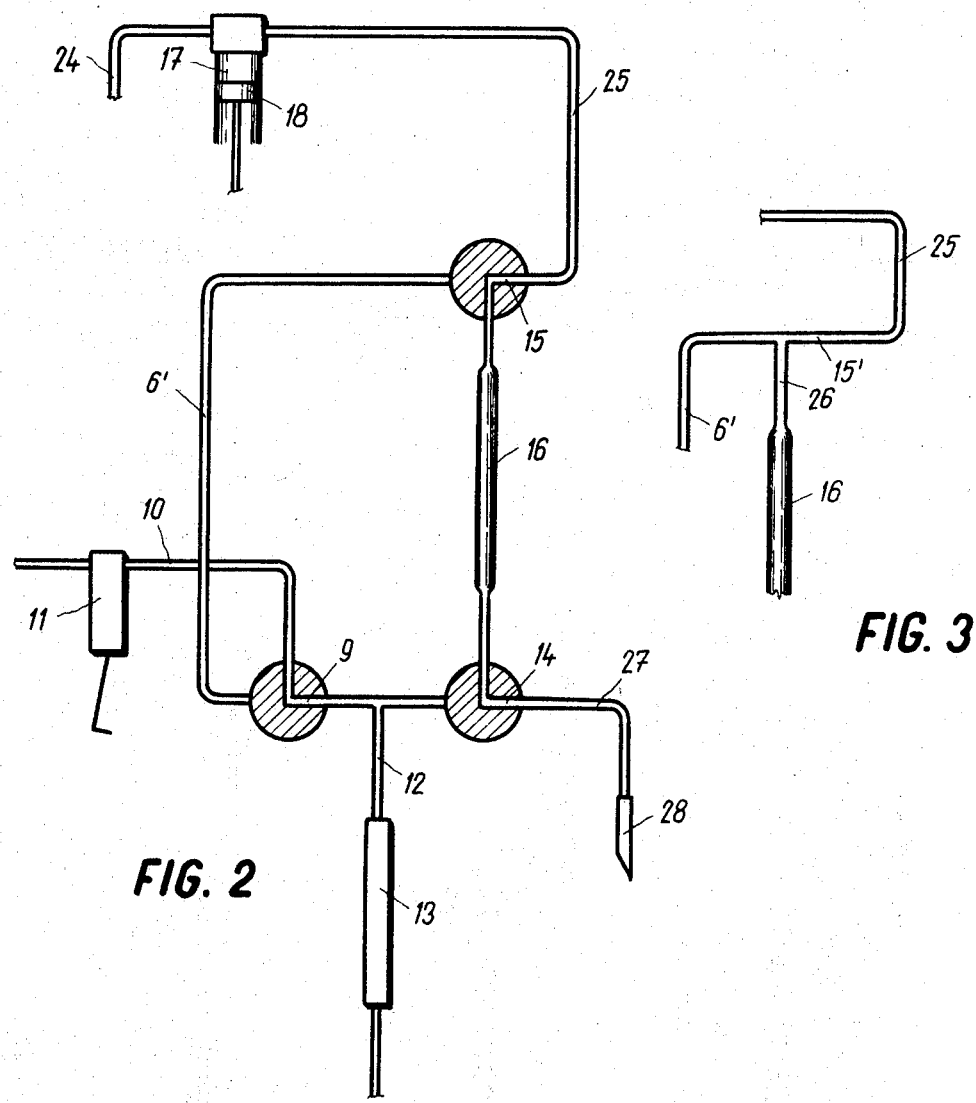

The same function and result can be achieved by a set of three standard three-way cocks, the spindles of which include ports 9, 14 and 15, bent to an angle, as shown in FIG. 2. The remaining elements in FIG. 2 have the same functions and are identified by the same reference marks as in FIG. 1. Under these conditions it is possible to dispense with the interconnection realized by the port 15 and to replace it by a straight branched-out connection 15' between the tubings 26, 25 and 6', which according to FIG. 2 or 3, replace the interconnection of the necks 6 and 7 according to FIG. 1.

When the port 15 is left out according to FIG. 3, it is necessary for the piston 17 with the cylinder 18 to safely resist the pressures necessary for the flow through the column 14. If necessary, these pressures may be increased with regard to the standard pressures in the column when a sample is transported from the receptacle. In the embodiment with a port 15, the piston 17 with the cylinder 18 need not practically stand up to any pressures at all, as the destined only for drawing liquids and possible gas pistons into the receptacle 16, this operation being, if desired, realizable even on extremely low speed. The transfer of the sample has to form only a small fraction of the time required for the entire chromatographic process, if an extension of the time of the transfer of the sample shall not have undesirable effects as one of the factors that decreases the accuracy of the separation in the resultant chromatogram.

FIG. 4 diagrammatically shows another alternative, which differs from the two preceding ones by the sample, drawn into the receptacle 16 through the action of the piston 17 and cylinder 18, not being forced to enter the column 13, as described earlier, through the tubing 12, by the action of the main pump 11, but instead, being displaced by the piston 17, itself, the notion of which takes place in a reversed direction for the interval during which the sample is forced to enter the column 13. In this particular case it is necessary to use a pump with a slide valve.

The apparatus shown in FIG. 4 operates as follows: With the port 14 in the position indicated in the drawing, the sample is drawn in by the needle 28 over the tubing 27, and into the receptacle 16 under the action of the piston 17, as described in the case of the apparatus shown in FIG. 1. The pump 11 meanwhile delivers the buffers into the column 13 through the tubing 10. The sample can be advantageously drawn by suction into the receptacle 16 again only immediately prior to the transfer of the sample into the column. This transfer is achieved in such a way that a port 14 provided in the spindle of the respective three-way cock is turned so as to connect the receptacle 16 to a branched-out conduit 5′ and thereby to the column 13. Next the piston 17, during its reversed operation, begins to force out the sample, and possibly also the protective buffers drawn in at the same time from the receptacle 16 into the column 13, while the pump 11, may not be out of action for the respective time, provided, of course, that the piston 17 supplies an amount of throughflow approximately equivalent to the standard throughflow of the column. It is, however possible, to leave the pump 11 in operation even during the transfer of the sample from the receptacle 16 to the column 13.

In this latter case, there occurs, of course, a temporary increase of throughflow through the column with simultaneous increase of the pressure above the column, this presenting, sometimes an advantage, as it is possible to produce by this increased pressure, short timed, small amounts of compression of the ion-exchanger charge in the column, at the same time its level drops somewhat (this drop being of an order of one or a few milimeters only), such forming a liquid-filled space between the column closure and the level of its charge. In the liquid-filled space thus formed it is sometime possible to achieve advantageously a mixing of the sample with small amounts of the buffer before the sample enters the column. By this measure the durability of certain coatings can be extended which are applied to the walls of the receptacles and tubings in order to make them water-repellent. So, for instance, when this hydrophobization has been made by application of silicons, the same covering buffers require a solution in which the dosed sample dissolved has an extremely low acidity, such as pH 6, in order that a durability of the silicon layers making the walls water-repellent, is maintained. However, such a low acidity affect during routine analyses of amino acids in cation exchanger columns, as a rule the accuracy of the separation of the individual constituents. For obtaining the maximum possible accuracy of the separation it is required, on the contrary, that the sample enters the column in a medium of a considerably high acidity, such as pH 2 to pH 3. The mixing of a medium of relatively low acidity or of a neutral medium, togeher with which the sample is in the receptacle, with a buffer of a sufficient acidity, in order that the second aforesaid condition may be met, is feasible according to the method just described. At the time of the transfer of the sample or immediately before the pump 11 draws in a buffer of such an acidity or a normality increased to a point where the initially analyzed sample in the topmost layers of the cation exchanger column is trapped with the best efficiency possible. A similar effect may also be obtained by making the pump 10 drawn in, at the time of the sample transfer and wtih a sufficient anticipation to the dosing operation, a buffer of the aforesaid properties, in order to convert the column into such a condition that its own capacity is utilized for establishing an equilibrium with a buffer of the said properties at least in the topmost layers of the column, whereby the necessary conditions are created for a satisfactory fixing of the sample in the uppermost layers of the chromatographic column.

In order that the pump 11 may draw in the said anomalous buffer immediately before the dosing period and during this period, it is necessary to arrange a hydraulic change-over switch before the pump 11 for any of the alternative embodiments indicated in the FIGS. 1–4.

When the apparatus is arranged to operate as shown in FIG. 4, the delivery branch of the pump need not lead to the drain, as this was the case in the embodiments illustrated in FIGS. 1 and 2, but it will be advantageous to arrange the pump to perform a rinsing in a reversed manner, as compared to the arrangements illustrated in FIGS. 1 and 2, that is, according to FIG. 4 in such a way that the rinsing solutions flow, during rinsing of the receptacle 16 in a direction from the pump 17 towards the receptacle 16 and the needle 28. It is a condition of such an arrangement, that the tubing 24 does not lead to the drain only, but, with its alternating functions of a delivery and an intake branch, it should lead to the reservoir of the respective solutions by way, for instance, of the multi-way changer-over switch 24″.

The same effect may be obtained by incorporating an additional pump 17′, attached by means of tubing 25″ which branches off the tubing 25, as shown by a dashed outline in FIG. 4. When these two pumps are used, it is sufficient for one of them to be connected permanently as a delivery pump and the other as a sucking pump. It is assumed that all functions involved in the engagement of the respective pumps as well as the switching-over of the hydraulic change-over switches, are accomplished by a programming device.

The entire arrangement can be simplified as shown in FIG. 5, whereby, however, certain advantages have to be dispensed with, which are inherent to the arrangement as shown in FIGS. 1 to 4.

The cylinder 17 with the piston 18 are here choosen in a sufficient size, without any particular valve gear, so that the receptacle 16, connected to the cylinder 17 by the piping 25, forms part of the working compartment of the cylinder 17. The port 14 of the three-way cock, to which the bottom end of the receptacle 16 is linked, has here the function of a valve gear to the cylinder 17. It is to be assumed that for an aspiration of the buffer with the corresponding protective buffers only a single, even intermittent, stroke of the piston 18 is required, as shown in FIG. 1. When the sample is drawn in by way of the needle 28 and the intake tubing 27, the piston 18 presses out the entire content of the receptacle 16 after turning of the port 14 in such a way that the content of the receptacle passes through the branched-out tube 5′ and the tubing 12 into the column 13. By means of a feeding mechanism for the reservoirs as represented in FIG. 1, it is possible to achieve that by the needle 28 there is first drawn in and then discharged a purifing solution for removal of the residues of substance which have been previously dosed to the receptacle 16, the tubing 27 and the needle 28. Then follows the actual filling of the receptacle 16, there being a possibility of filling it first with a protecting buffer, then with the sample itself, after which there may again follow, if necessary, a rinsing protective buffer which remains in the bottom portion of the receptacle 16. During the upward move of the piston 18, after the port 14 has been turned, the entire content of the receptacle is transferred into the column 13, thus terminating the dosing of the sample to the column.

What is claimed is:

1. Automatic sample liquid loading apparatus for a liquid chromatography column having an inlet means comprising:
  sample support means having a plurality of sample storage receptacles disposed in spaced apart relationship;
  an intermediate sample storage receptacle;
  sample off-take means having an inlet means and an outlet means;
  control means for providing intermittent relative movement between said sample support means and said sample off-take means for sequentially fluid coupling said inlet means of said sample off-take means with each of the plurality of sample storage receptacle in sequence;
  aspirating means;
  pump means;

valve means for alternatively fluid coupling said intermediate sample storage receptacle to and between said outlet means of said sample off-take means and aspirating means, whereby to convey a liquid sample from a respective sample storage receptacle into said intermediate sample storage receptacle, and to and between said inlet means of said chromatography column and said pump means, whereby to convey such a liquid sample from said intermediate sample storage receptacle into said inlet means of said chromatography column.

2. Apparatus according to claim 1 wherein:
said pump means is fluid coupled to a source of eluent liquid, whereby when said pump means is fluid coupled to said intermediate sample storage receptacle, it is adapted to transmit eluent liquid through said intermediate sample storage receptacle to convey thereby such sample liquid into said inlet means of said chromatography column.

3. Apparatus according to claim 1 wherein:
said inlet means of said sample off-take tube is a tube adapted to be mounted within a respective sample storage receptacle.

4. Apparatus according to claim 1 wherein:
said sample support means further includes an additional liquid storage receptacle; and
said control means is adapted to fluid couple said inlet means of said sample off-take means to said additional liquid storage receptacle between such fluid coupling to successive sample storage receptacles, whereby successive sample liquids conveyed to said intermediate storage receptacles are spaced apart by a quantity of additional liquid.

5. Apparatus according to claim 1 wherein:
said intermediate storage receptacle is a capillary tube.

6. Apparatus according to claim 1 comprising a thin membrane covering and protecting each sample receptacle, and a reciprocable injection needle forming the sample off-take means and during its downward movement piercing said membrane.

7. Automatic sample liquid apparatus for a liquid chromatography column having an inlet means, comprising: sample support means having a plurality of sample storage receptacles; an intermediate storage receptacle; sample off-take means; means for sequentially fluid coupling said sample off-take means with selected ones of the plurality of sample storage receptacles in sequence; and valve means alternatively coupling said intermediate storage receptacle to said sample off-take means to convey a liquid sample from a respective sample storage receptacle into said intermediate sample storage receptacle, and to said inlet means of said chromatography column to convey such liquid sample from said intermediate storage receptacle to said inlet means of said chromatography column.

8. Apparatus as defined in claim 7, further including control means for providing intermittent relative movement between said sample support means and said sample off-take means, said control means being operative to position said sample off-take means with respect to selected ones of the plurality of sample storage receptacles in sequence.

9. Apparatus as defined in claim 7, wherein said sample off-take means includes aspirating means for removing a liquid sample from a respective sample storage receptacle when positioned with respect to said sample off-take means.

10. Apparatus as defined in claim 7, wherein said valve means further includes pump means for conveying such liquid sample from said intermediate storage receptacle into said inlet or said chromatography column.

11. Apparatus as defined in claim 10, wherein said pump means is further operative to transmit eluent fluid through said intermediate storage receptacle to convey such liquid sample into said inlet of said chromatography column.

12. Apparatus as defined in claim 7, wherein said sample off-take means includes inlet means defined by a hollow needle-like structure, said fluid coupling means being further operative to provide relative movement between said inlet means of said sample off-take means and at least the sample storage receptacle positioned with respect to said inlet means of said sample off-take means to effect fluid coupling between said sample take-off means and said positioned sample storage recepatcle.

13. Automatic sample liquid apparatus for a liquid chromatography column having an inlet means, said apparatus comprising sample support means having a pluraltiy of sample storage receptacles, an intermediate storage receptacle, means for selectively transferring a sample liquid from one of said sample receptables to said intermediate receptacle, means for conducting sample liquid from said intermediate receptacle to said column inlet means, said transferring means communicating with said intermediate receptacle in alternating relation with said conducting means, whereby liquid from said sample receptacle is transferred to said intermediate receptacle and subsequently transferred from said intermediate receptacle to said column inlet means.

14. Automatic sample liquid apparatus according to claim 13 wherein said conducting means includes a source of eluent fluid and means for supplying said eluent fluid from said source to said inlet means through said intermediate receptacle.

15. Automatic sample liquid apparatus according to claim 13 including a valve assembly, said valve assembly being adjustable between a first position and a second position, said first valve position placing said sample receptacle in fluid communication with said intermediate receptacle, said valve in a second position placing said intermediate receptacle in communication with said inlet means and in communication with a source of eluent liquid and disconnecting said intermediate receptacle from said sample receptacles, whereby alternating said valve assembly between said first and second positions causes the transfer of samples from said sample receptacles to said intermediate receptacle and subsequently from said intermediate receptacle to said column inlet means.

References Cited

UNITED STATES PATENTS

| | | |
|---|---|---|
| 3,032,953 | 5/1962 | Micheletti. |
| 3,081,158 | 3/1963 | Winter. |
| 3,166,929 | 1/1965 | Pelavin. |
| 3,192,969 | 7/1965 | Baruch. |

S. CLEMENT SWISHER, Primary Examiner